G. FORNONZINI.
SIGHTING MEANS FOR FIREARMS, OPTICAL APPARATUS, AND THE LIKE.
APPLICATION FILED MAY 3, 1916.

1,329,075. Patented Jan. 27, 1920.

Inventor
Gervaso Fornonzini
By
Attorney

UNITED STATES PATENT OFFICE.

GERVASO FORNONZINI, OF LANZADA, ITALY.

SIGHTING MEANS FOR FIREARMS, OPTICAL APPARATUS, AND THE LIKE.

1,329,075.  Specification of Letters Patent.  Patented Jan. 27, 1920.

Application filed May 3, 1916. Serial No. 95,110.

*To all whom it may concern:*

Be it known that I, GERVASO FORNONZINI, gentleman, subject of the King of Italy, resident of Lanzada, Valtellina, in the Kingdom of Italy, have invented new and useful Improvements in Sighting Means for Firearms, Optical Apparatus, and the like, of which the following is a specification.

This invention relates to sights for fire arms and other implements and devices; and it proposes, briefly, certain hereinafter described improvements whereby accurate aiming for all conditions of background is facilitated by means of a simple arrangement of contrasting colors, each of which has the effect of accentuating the other.

According to the invention, the improved sight is provided with an inclined surface or surfaces having distinct light and dark portions, produced in various ways; and it is the object of the invention both to render the light portion more vivid, and to avoid reflection in the case of the dark portion.

The invention is illustrated in a more or less diagrammatic manner in the accompanying drawing, in which.

Figure 1:
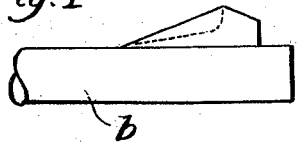
Figures 1, 2 and 3 are, respectively, a side elevation, a plan view, and a view facing the sighter, of one form of sight.

Referring to Fig. 1, the sight therein depicted has the form of a metal plate or block which is mounted upon the gun barrel *b* or the like, and is provided with at least one surface that slopes upwardly toward the muzzle of the barrel. This inclined surface may be either white or black, or it may, if desired, be of both colors. The white color is preferably applied in the form of a hard, oven-baked enamel, to increase its brilliancy, while the black color is produced by a dull paint, and is grooved or otherwise indented so as to avoid all reflection of light therefrom which would cause it to present a white or light appearance to the sighter.

Figure 2:
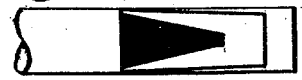

The inclined surface has the shape of an isosceles triangle, or of a slightly-truncated isosceles triangle, the altitude of which is very considerably greater than its base, and the apex or truncated end of which is directed toward the muzzle of the barrel. This surface, in the form shown in Figs. 1 and 2, is grooved longitudinally, the groove taking the triangular shape above referred to and being painted black and indented.

Figure 4:
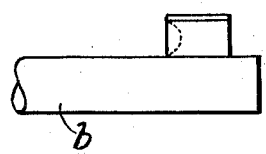
Figs. 4, 5 and 6 are similar views of another form of sight.
Figure 5:
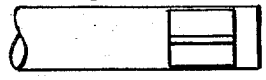
Figure 3:
Figure 6:

The form represented in Figs. 4 and 5 is also grooved, as indicated in dotted lines, and its upper face is provided with a small longitudinal rib, the wall of the groove being painted black, so that the effect depicted in Fig. 6 is obtained when loooking toward the sight.

I claim as my invention:—

1. A sight, comprising a metallic member having a hard, bright white-enameled portion, and a dull black portion, the two portions facing the sighter and being arranged in direct juxtaposition so as to present a marked contrast to each other, the black portion of said member being grooved to avoid reflection of light.

2. A sight, comprising a metallic member having a hard, bright, white-enameled portion, and a dull black portion in marked contrast thereto, one of such portions having substantially the shape of an isosceles triangle, the altitude of which is considerably greater than the base.

3. A sight, comprising a metallic member having a hard, bright, white-enameled portion, and a dull black portion in marked contrast thereto, one of such portions having substantially the shape of an isosceles triangle, the altitude of which is considerably greater than the base, the black portion of said member being grooved to avoid reflection of light.

In testimony whereof I hereunto affix my signature.

GERVASO FORNONZINI.